United States Patent
Ogawa

(10) Patent No.: US 6,513,935 B2
(45) Date of Patent: Feb. 4, 2003

(54) LENS-LESS PROJECTION OPTICAL SYSTEM OF REFLECTION TYPE

(75) Inventor: Jun Ogawa, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 09/909,889

(22) Filed: Jul. 23, 2001

(65) Prior Publication Data

US 2002/0030791 A1 Mar. 14, 2002

(30) Foreign Application Priority Data

Jul. 28, 2000 (JP) ........................................ 2000-228798

(51) Int. Cl.[7] ................... G03B 21/26; G03B 21/28; G03B 21/00; G02B 5/10; G02B 5/08
(52) U.S. Cl. ........................ 353/37; 353/99; 353/122; 359/859; 359/857
(58) Field of Search ........................ 353/30, 37, 50, 353/51, 73, 77, 78, 98, 99, 122; 359/858, 838, 839, 857, 859

(56) References Cited

U.S. PATENT DOCUMENTS 5,410,434 A * 4/1995 Shafer .................... 359/838
6,254,243 B1 * 7/2001 Scrivens ................. 359/883

* cited by examiner

*Primary Examiner*—Russell Adams
*Assistant Examiner*—Andrew Sever
(74) *Attorney, Agent, or Firm*—Sughrue Mion, PLLC

(57) ABSTRACT

A lens-less projection optical system of the reflection type is provided with four reflecting mirrors, which successively reflect a light flux transmitted through a picture-forming device. The light flux reflected by the fourth reflecting mirrors is projected on the screen. The second reflecting mirror is so situated that its reflecting surface shaped into a convexly curved surface is directed to the light flux reflected from the first reflecting mirror. The third reflecting mirror is so situated that its reflecting surface shaped into a convexly curved surface is directed to the light flux reflected form the second reflecting mirror. The fourth reflecting mirror is so situated that its reflecting surface shaped into a convexly curved surface is directed to the light flux reflected from the third reflecting mirror.

13 Claims, 5 Drawing Sheets

FIG. 3

| i | $F_i(\rho, \phi)$ |
|---|---|
| 1 | 1 |
| 2 | $\sqrt{4}\rho\cos\phi$ |
| 3 | $\sqrt{4}\rho\sin\phi$ |
| 4 | $\sqrt{3}(2\rho^2-1)$ |
| 5 | $\sqrt{6}(\rho^2\sin 2\phi)$ |
| 6 | $\sqrt{6}(\rho^2\cos 2\phi)$ |
| 7 | $\sqrt{8}(3\rho^3-2\rho)\sin\phi$ |
| 8 | $\sqrt{8}(3\rho^3-2\rho)\cos\phi$ |
| 9 | $\sqrt{8}\rho^3\sin 3\phi$ |
| 10 | $\sqrt{8}\rho^3\cos 3\phi$ |
| 11 | $\sqrt{5}(6\rho^4-6\rho^2+1)$ |
| 12 | $\sqrt{10}(4\rho^4-3\rho^2)\cos 2\phi$ |
| 13 | $\sqrt{10}(4\rho^4-3\rho^2)\sin 2\phi$ |
| 14 | $\sqrt{10}\rho^4\cos 4\phi$ |
| 15 | $\sqrt{10}\rho^4\sin 4\phi$ |
| 16 | $\sqrt{12}(10\rho^5-12\rho^3+3\rho)\cos\phi$ |
| 17 | $\sqrt{12}(10\rho^5-12\rho^3+3\rho)\sin\phi$ |
| 18 | $\sqrt{12}(5\rho^5-4\rho^3)\cos 3\phi$ |
| 19 | $\sqrt{12}(5\rho^5-4\rho^3)\sin 3\phi$ |
| 20 | $\sqrt{12}\rho^5\cos 5\phi$ |
| 21 | $\sqrt{12}\rho^5\sin 5\phi$ |
| 22 | $\sqrt{7}(20\rho^6-30\rho^4+12\rho^2-1)$ |
| 23 | $\sqrt{14}(15\rho^6-20\rho^4+6\rho^2)\sin 2\phi$ |
| 24 | $\sqrt{14}(15\rho^6-20\rho^4+6\rho^2)\cos 2\phi$ |
| 25 | $\sqrt{14}(6\rho^6-5\rho^4)\sin 4\phi$ |
| 26 | $\sqrt{14}(6\rho^6-5\rho^4)\cos 4\phi$ |
| 27 | $\sqrt{14}\rho^6\sin 6\phi$ |
| 28 | $\sqrt{14}\rho^6\cos 6\phi$ |

LENS-LESS PROJECTION OPTICAL SYSTEM OF REFLECTION TYPE

FIELED OF THE INVENTION

The invention relates to a lens-less projection optical system of a reflection type which is used as a display of a projection type, and especially to an improvement of a lens-less projection optical system of a reflection type.

Projectors which are recently used as displays of a projection type are classified into a rear projector and a front projector. In the rear projector, it is the general trend that a picture is projected on a screen by means of a LCD (a liquid crystal display) projector instead of a CRT (a cathode ray tube) projector which has been conventionally used for the same purpose. The LCD projector is required to be thin and lightweight because of its property. In the front projector, it is important to widen the angle of view of the projected picture so that the projector can be used in the ordinary home in a condition that the interval between the screen and the projector is narrow.

In order to meet the aforementioned request, the lens-less projection optical system of the reflection type to be used as the projector has been devised. FIG. 1 shows a typical example of the conventional lens-less projection optical system of the reflection type.

The lens-less projection optical system of the reflection type shown FIG. 1 is composed of three reflecting mirrors 103a, 103b, 103c, each having a reflecting surface shaped into an aspherical surface. A light flux starting from a picture-forming device of a transmission type 102 is successively reflected by the reflecting mirrors 103a, 103b, 103c, and projected on the screen (not shown).

The first reflecting surface 103a is so situated that its concave surface shaped into the aspherical surface is directed to an picture formation surface of the picture-forming device of the transmission type 102. The second reflecting mirror 103b is so situated that its convex surface shaped into the aspherical surface is directed to a light flux reflected from the first reflecting mirror 103a. The third reflecting mirror 103c is so situated that its convex mirror shaped into the aspherical surface is directed to the light flux reflected from the second reflecting mirror 103b.

The light flux starting form the light source 101 is transmitted through the picture-forming device of the transmission type 102, and successively reflected by the first to third reflecting mirrors 103a, 103b, 103c. The light flux reflected by the third reflecting mirror 103c is projected on the screen.

In this way, the chromatic aberration can be suppressed by using the lens-less projection optical system of the reflection type. Moreover, since the light path can be folded, the optical system can be made compact. Furthermore, since the internal reflection is little, the high contrast and the high resolution of the projected picture can be obtained by the simple structure. As mentioned in the above, the lens-less projection optical system of the reflection type has the various advantages.

However, several disadvantages have been pointed out on the lens-less projection optical system of the reflection type as mentioned later.

The first disadvantage is that it is difficult to increase the angle of view of the projected picture. For example, when the maximum angle of view is made more than 120°, it becomes necessary to increase the intervals between the adjacent reflecting mirrors 103a, 103b, 103c. Moreover, since the optical paths are widened as the angle of view is widened, the light fluxes distribute on the perspective reflecting mirrors l03a, 103b, 103c in wide ranges, and it becomes necessary to increase the sizes of the respective reflecting mirrors 103a, 103b, 103c. Especially, the third reflecting mirror 103c is magnified sharply. Since the whole optical system is magnified as the angle of view is widened, it is difficult to widen the angle of view especially in case that the size of the whole optical system is limited. Moreover, since a fan-shaped distortion aberration that a width of a lower portion of the projected picture is narrowed and the higher portion of the same is widened is caused as the angle of view increases, it is also difficult to increase the angle of view from this view point.

The second disadvantage is that the lens-less projection optical system of the reflection type is magnified. Although this disadvantage relates to the aforementioned difficulty in widening the angle of view, there are still the other factors which cause similar problems beside that. Explaining concretely, the optical system is magnified unavoidably in order to correct the distortion aberration. That is to say, since the aforementioned conventional lens-less projection optical system is composed of the three reflecting mirrors 103a, 103b, 103c, the degree of freedom in correcting the distortion aberration is limited. As a result, it becomes necessary to increase the intervals between the adjacent reflecting mirrors 103a, 103b, 103c, and thereby the lens-less projection optical system of the reflection type is magnified.

SUMMARY OF THE INVENTION

Accordingly, it is an object of the invention to eliminate the aforementioned disadvantages of the conventional optical system, to prevent the lens-less projection optical system of the reflection type from being magnified, and to provide a lens-less projection optical system of the reflection type which can widen the angle of view of the projected picture.

According to the feature of the invention, a lens-less projection optical system of a reflection type which successively reflects a light flux starting from a picture-forming device by means of four reflecting mirrors, comprises:

a first reflecting mirror which is so situated that its reflecting surface shaped into a concavely curved surface receives the light flux starting from the picture-forming device, a second reflecting mirror which is so situated that its reflecting surface shaped into a convexely curved surface is directed to the light flux reflected from the first reflecting mirror, a third reflecting mirror which is so situated that its reflecting surface shaped into a convexly curved surface is directed to the light flux reflected from the second reflecting mirror, and a fourth reflecting mirror which is so situated that its reflecting surface shaped into a convexly curved surface is directed to the light flux reflected from the third reflecting mirror.

According to the invention written in claim 1, the distances between the adjacent reflecting mirrors can be narrowed, and the sizes of the reflecting mirrors can be reduced.

In the invention written in claim 2, a reflecting surface of at least one of the four reflecting mirrors is shaped into a freely curved surface.

According to the invention written in claim 2, since the reflecting surface of at least one of the reflecting mirrors can be shaped into an ideally curved surface by introducing the freely curved surface, the degree of freedom in correcting the distortion aberration of the light flux reflected from the freely curved surface can be heightened. According to the aforementioned process, the distortion aberration can be corrected.

In the invention written in claim 3, a reflecting mirror of at leas one of the four reflection mirror is shaped into a freely curved surface, and a reflecting surface of at least one of the remaining reflecting mirrors is shaped into an asphrical surface.

According to the invention written in claim 3, since the reflecting surface of at least one of the reflecting mirrors can be shaped into the ideally curved surface by introducing the freely curved surface, the degree of freedom in correcting the distortion aberration of the light flux reflected from the freely curved surface. Moreover, the processing cost of the optical system can be reduced by shaping the reflecting surface of at least one of the remaining reflecting mirrors into the aspherical surface which is easy to be processed.

In the invention written in claim 4, the reflecting surface of the fourth reflecting mirror is shaped in to an aspherical surface.

According to the invention written in claim 4, since the reflecting surface of the fourth reflecting mirror having a lager external shape than those of the other reflecting mirrors can be easily processed, the fabricating cost of the optical system can be further reduced.

In the invention written in claim 5, each of the reflecting mirrors is formed of resin.

According to the invention written in claim 5, since the reflecting mirrors can be formed without the grinding and polishing processes which are indispensable in case that the reflecting mirrors are formed of glass, the fabricating cost of the optical system can be sharply reduced.

BRIEF DESCRIPTION OF THE DRAWINGS

The invention will be explained more detail in conjunction with appended drawings, wherein:

FIG. 3 shows forms of functions $F_i(\rho,\Phi)(i=1, 2 \ldots, 27, 28)$.

DISCRIPTIONI OF THE PREFERRED EMBODIMENT

The first preferred embodiment of the invention will be explained referring to FIGS. 2, 3.

Figure 1:
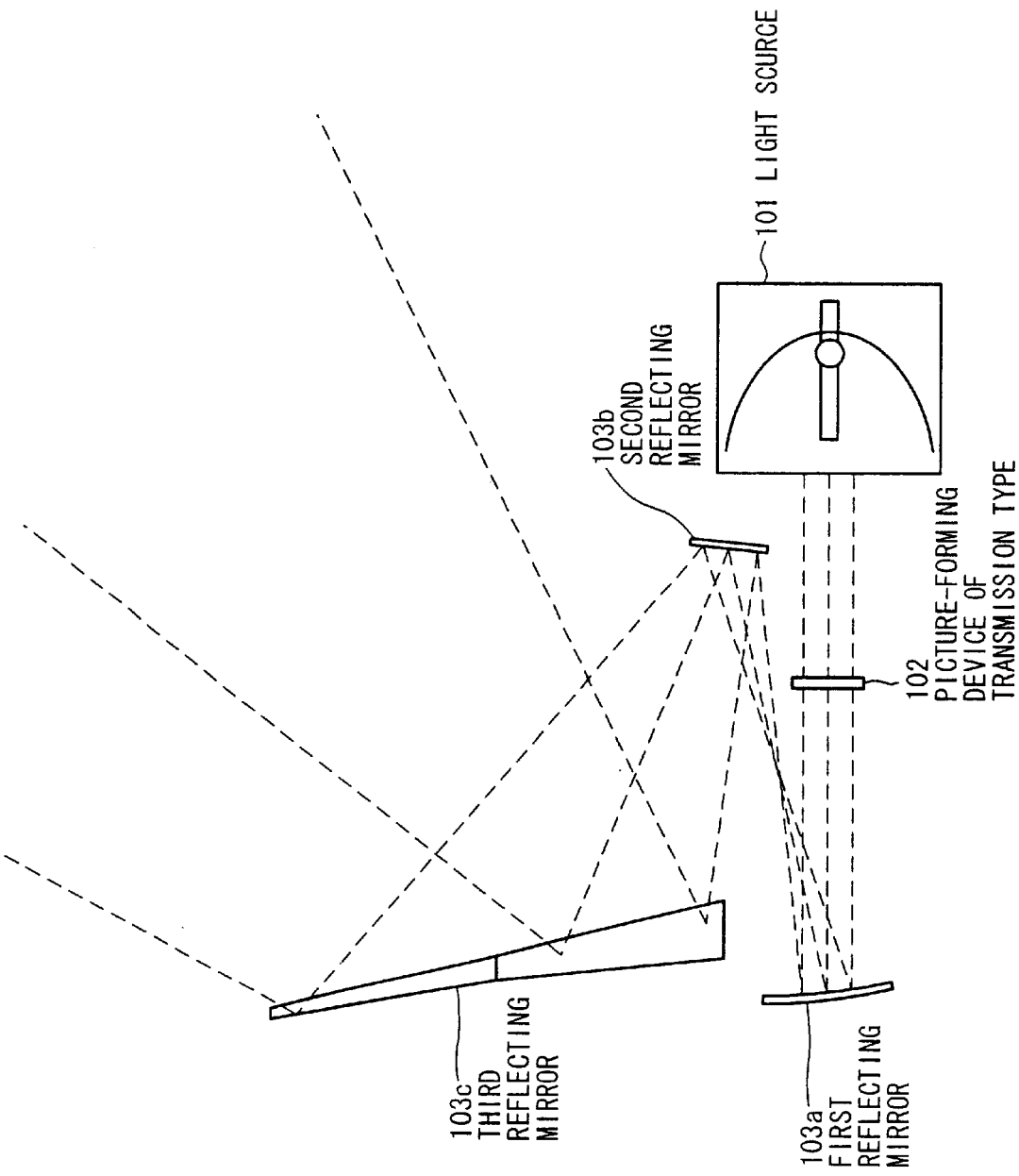
FIG. 1 is a cross-sectional view for showing a conventional lens-less projection optical system of a reflection type.
Figure 2:
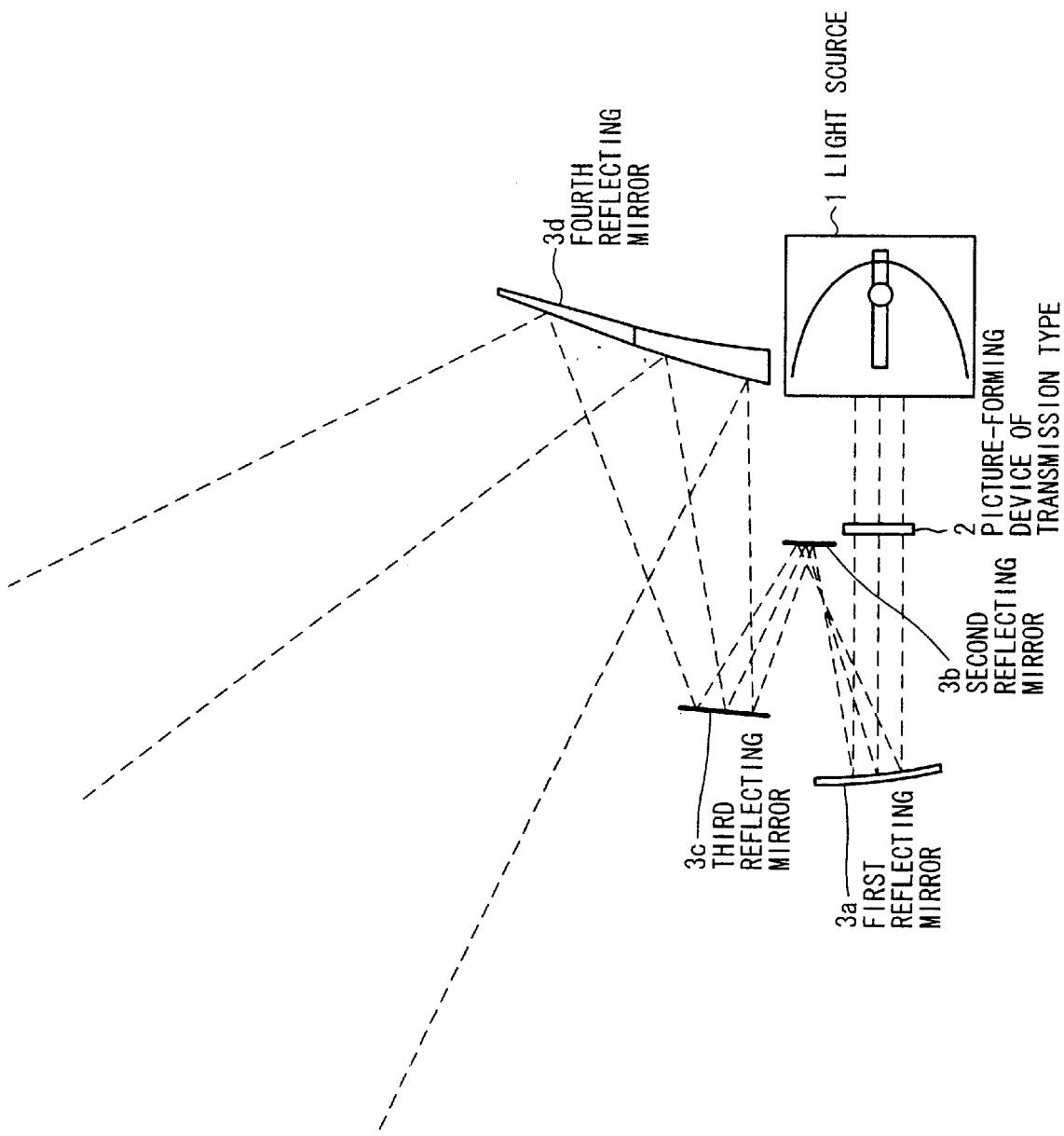
FIG. 2 is a cross-sectional view for showing a lens-less projection optical system of a reflection type according to the first preferred embodiment of the invention.

A lens-less projection optical system of a reflection type shown in FIG. 2 is composed of the first and fourth reflecting mirrors $3a$, $3d$ shaped into aspherical surfaces, and the second and third reflection mirrors $3b$, $3c$ shaped into freely curved surfaces. A light flux transmitted through a picture-forming device of a transmission type 2 is successively reflected by the four reflecting mirrors $3a$, $3b$, $3c$, $3d$, and projected on a screen.

Herein, the first reflecting mirror $3a$ is so situated that its concave surface shaped into the aspherical surface is directed to the picture-forming device of the transmission type 2. The second reflecting mirror $3b$ is so situated that its convex surface shaded into the freely convex surface is directed to the light flux reflected from the first reflecting mirror $3a$. The third reflecting mirror $3c$ is so situated that its convex surface shaped into the freely curved surface is directed to the light flux reflected from the second reflecting mirror $3b$. The fourth reelecting mirror $3d$ is so situated that its convex surface shaped into the aspherical surface is directed to the light flux reflected for the third reflecting mirror $3c$. Intervals between the first and second reflecting mirrors $3a$, $3b$, and between the second and third reflecting mirrors $3b$, $3c$ are narrower than an interval between the third and fourth reflecting mirrors $3c$, $3d$.

In the aforementioned optical system according to the first preferred embodiment, each of the reflecting mirrors $3a$, $3b$, $3c$, $3d$ is formed of resin.

The light flux starting from the light source 1 is transmitted through the picture-forming device of the transmission type 2, and successively reflected by the reflecting mirrors $3a$, $3b$, $3c$, $3d$. Finally, the light flux reflected by the fourth reflecting mirror $3d$ is projected on the screen (not shown). The angle of view of the projected picture attains the width of more than 120°.

Shapes of the reflecting surface of the second and third reflecting mirrors $3b$, $3c$ shaped into the freely curved surfaces are represented by the following equations in terms of Fritz Zernike's polynomials.

$$z = \frac{c\rho^2}{1 + \sqrt{1 - (1+k)c^2\rho^2}} + \sum_{i=1}^{8} a_i \rho^{2i} + \sum_{i=1}^{28} A_i F_i(\rho, \phi)$$

$$\begin{cases} \rho = \sqrt{x^2 + y^2} \\ \phi = \tan^{-1}\left(\frac{y}{x}\right) \\ c = \frac{1}{r} \end{cases}$$

In the above relations, z is a depth of the reflecting surface, k is a conical constant, c is the curvature of the reflecting surface at an apex of the optical axis, $\rho$ is a height above the optical axis, $\alpha_i(i=1,2, \ldots, 27,28)$ are respectively correction coefficients, and r is the radius of curvature of the reflecting surface at the apex of the optical axis. x and y are respectively the abscissa and the ordinate of the Cartesian coordinate. The functions $F^i(\rho,\phi)(i=1,2, \ldots, 27,28)$ are given in FIG.3.

Subsequently, the shapes of the reflecting surfaces of the first and fourth reflecting mirrors $3a$, $3d$ shaped into the aspherical surfaces are represented by the following equations.

$$z = \frac{c\rho^2}{1 + \sqrt{1 - (1+k)c^2\rho^2}} + \sum_{i=1}^{8} a_i \rho^{2i}$$

$$\begin{cases} \rho = \sqrt{x^2 + y^2} \\ c = \dfrac{1}{r} \end{cases}$$

In the above relations, z is a depth of the reflecting surface, k is a conical constant, c is the curvature of the reflecting surface at the apex of the optical axis, ρ is the high above the optical axis, $\alpha_i$(i=1, 2, . . . , 7, 8) is a correction coefficient, and r is the radius of curvature of the reflecting surface at the apex of the optical axis. Moreover, x and y are respectively the abscissa and the ordinate of the Cartesian coordinate.

The shapes of the reflecting surfaces of the reflecting mirrors 3a, 3b, 3d are never restricted to those represented by the aforementioned equations.

As mentioned in the above, since the four reflecting mirrors 3a, 3b, 3c, 3d are provided for the first preferred embodiment and the intervals between the first and second reflecting mirrors 3a, 3b, and between the second and the third reflecting mirrors 3b, 3c are narrower than the interval between the third and fourth reflecting mirrors 3c, 3d, the angle of view of the projected picture can be widened without magnifying the size of the whole optical system.

Explaining concretely, if the equal angle of view of the projected picture to that in the first preferred embodiment is desired in the conventional lens-less projection optical system of the reflection type composed of the three reflecting mirrors 103a, 103b, 103c, it becomes necessary to increase the intervals between the adjacent reflecting mirrors, and consequently, the reflecting mirror 103a, 103b, 103c are magnified. Especially, it becomes necessary that the third reflecting mirror 103c is made larger than the fourth reflecting mirror 3d in the first preferred embodiment. That is to say, if the wide angle of view is desired in the conventional lens-less projection optical system of the reflection type, the whole optical system is magnified.

However, in the first preferred embodiment, the intervals between the adjacent reflecting mirrors can be reduced by providing the four reflecting mirrors 3a, 3b, 3c, 3d, and the sizes of the respective reflecting mirrors 3a, 3b, 3c, 3d can be reduced. As a result, the angle of view can be widened preventing the whole optical system from being magnified in the first preferred embodiment.

Furthermore, according to the first preferred embodiment, since the first and fourth reflecting mirrors 3a, 3d, are shaped into the aspherical surfaces and the second and third reflecting mirrors 3b, 3c are shaped into the freely curved surfaces, the reflecting mirrors can be shaped into ideally curved surfaces, and the satisfactory results which can never be achieved by an optical system composed of reflecting mirrors shaped into spherical surfaces can be obtained. Moreover, the distortion aberration can be satisfactorily corrected, and the resolution of the picture projected on the screen can be heightened in the first preferred embodiment.

Moreover, since the second and third reflecting mirrors 3b, 3c are shaped into the freely curved surfaces, the degree of freedom in correcting the distortion aberrations of the light fluxes reflected from the reflecting mirrors 3b, 3c can be heightened. That is to say, since the more suitable shapes of the curved surfaces of the reflecting mirrors can be formed in conformity with the distortion aberrations, pending problems that the distortion aberrations of the projected picture cannot be corrected effectively in case that the angle of view is widened can be solved. As a result, the angle of view can be widened attaining the high resolution of the projected picture.

Although the two reflecting mirrors (the second and third reflecting mirrors 3b, 3c) are shaped into the freely curved surfaces in the first preferred embodiment, this condition should not be necessarily satisfied. For example, even if only one of the reflecting mirrors 3a, 3b, 3c, 3d is shaped into the freely curved surface, a similar effect to that achieved in the first preferred embodiment can be obtained. However, if the cost of the optical system is taken into consideration as mentioned later, it is desirable that the reflecting surface of the fourth reflecting mirror 3d having the largest external shape is shaped into the aspherical surface from the view point of reduction in price.

Since the fourth reflecting mirror 3d having a larger external shape than those of the other reflecting mirrors 3a, 3b, 3c is shaped into the aspherical surface which is easy to be processed, the processing cost of the optical system can be reduced. Furthermore, since the first reflecting mirror 3a is also shaped into aspherical surface, the fabricating cost of the optical system can be further reduced. Moreover, in the assembling process of the optical system in which the high accuracy is required, since the first and fourth reflecting mirrors 3a, 3d shaped into the aspherical surfaces are provided for the first preferred embodiment, the accuracy in the assembling process can be relaxed maintaining the high resolution of the projected picture. As a result, the cost originating in the assembling process can be reduced. That is to say, the cost of the whole optical system can be reduced by providing the two reflecting mirrors shaped into the aspherical surfaces (the first and fourth reflecting mirrors 3a, 3d in the first preferred embodiment).

Since the reflecting mirrors 3a, 3b, 3c, 3d are formed of resin, the lens-less projection optical system of the reflection type can be provided at a low price. Explaining concretely, although the complicated grinding and polishing processes are indispensable in case that the reflecting mirrors are formed of glass, the reflecting mirrors can be provided without going through the aforementioned complicated processes by forming the reflecting mirrors of resin. Accordingly, the fabricating cost of the optical system are reduced sharply, and the lens-less projection optical system of the reflection type can be provided at a low price. Moreover, material of the reflecting mirrors 3a, 3b, 3c, 3d is never restricted to resin, and other material may be adopted in consideration of cost and property thereof.

It should be noted that, in case that the lens-less projection optical system of the reflection type using the reflecting mirrors 3a, 3b, 3c, 3d formed of resin is applied to the display of the projection type, it is important to take the effect of heat generated by the light source 1 into consideration. Explaining concretely, since the light flux is distributed in a narrow range neighboring with the second and third reflecting mirrors 3b, 3c, the reflecting surfaces of these reflecting mirrors are apt to be affected by heat. Accordingly, it is desirable to so control the coefficient of linear expansion α of material of the second and third reflecting mirrors 3b, 3c that $\alpha < 6 \times 10^{-5}$ to relax the effect of heat.

Figure 4:
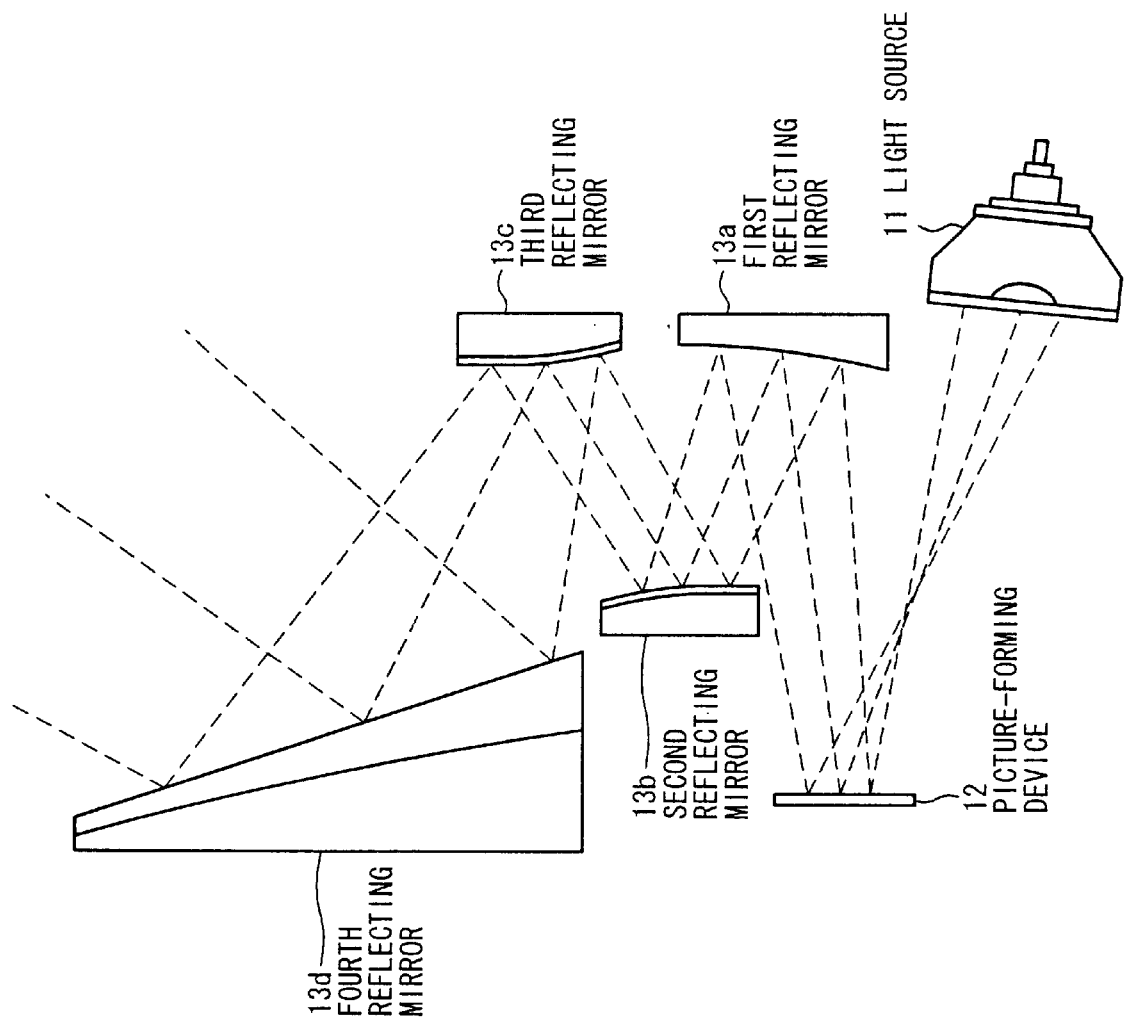
FIG. 4 is a cross-sectional view for showing a lens-less projection optical system according to the second preferred embodiment of the invention.

Next, the second preferred embodiment of the invention will be explained referring to FIGS. 4, 5. FIG. 4 is a cross-sectional view of the lens-less projection optical system of the reflection type according to the second preferred embodiment, and FIG. 5 is perspective view of the same.

Figure 5:
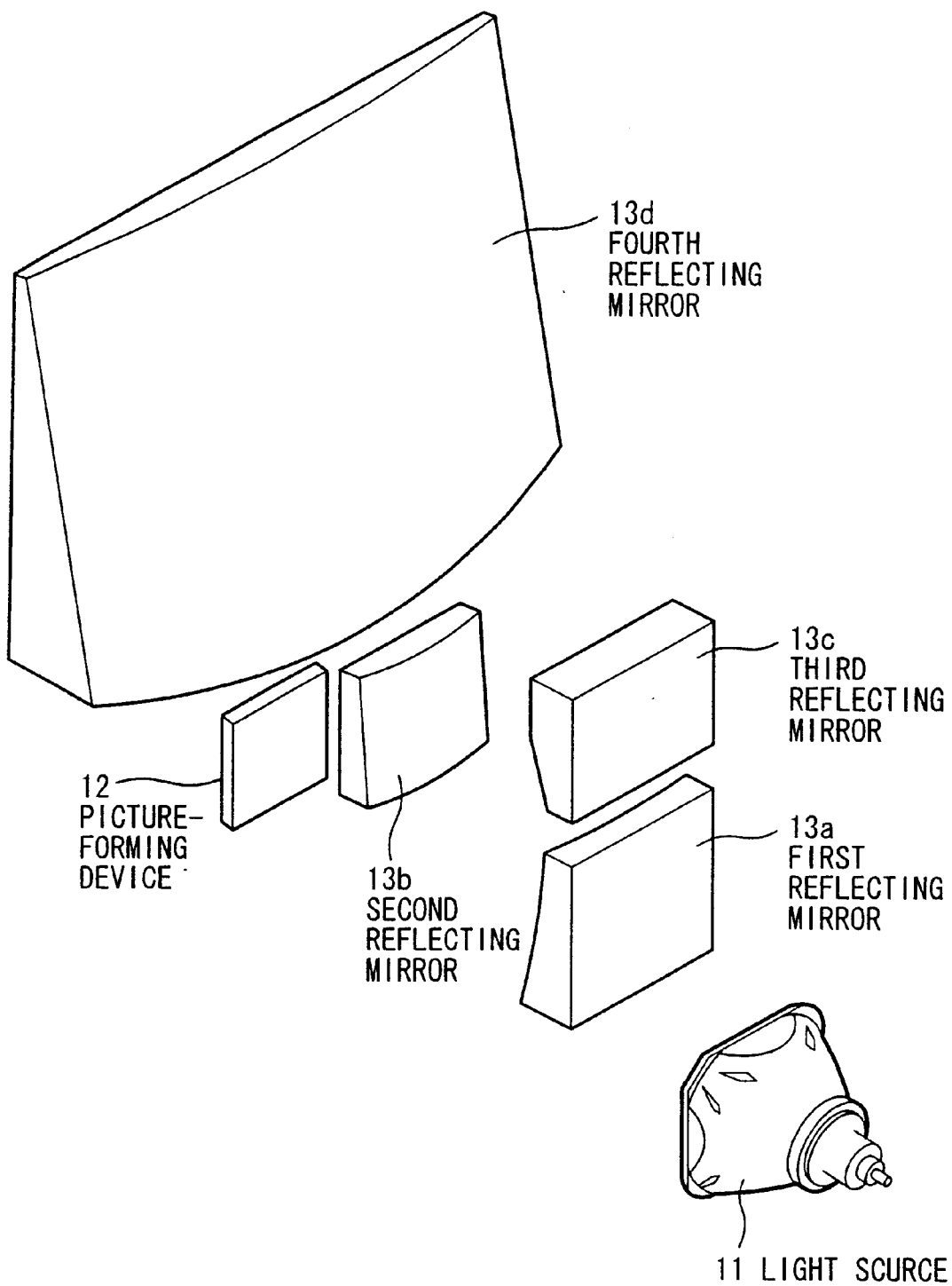
FIG. 5 is a perspective view for showing g a lens-less projection optical system according to the second preferred embodiment of the invention.

The lens-less projection optical system of reflection type shown in FIGS. 4, 5 is composed of the first to third reflecting mirrors 13a, 13b, 13c shaped into freely curved surfaces and the fourth reflecting mirror 13d shaped into an aspherical surface. In the optical system shown in FIG. 4, 5, a light flux reflected by or passing through the picture-forming device 12, such as a LCD of a reflection type or of a transmission type, is successively reflected by the reflecting mirrors 13a, 13b, 13c, 13d and projected on a screen.

Herein, the first reflecting mirror 13a is so situated that its concave surface shaped into the freely curved surface receives the light flux starting from a picture formation surface of the picture-forming device 12. The second reflecting mirror 13b is so situated that its convex surface shaped into the freely curved surface is directed to the light flux reflected from the first reflecting mirror 13a. The third reflecting mirror 13c is so situated that its convex surface shaped into the freely curved surface is directed to the light flux reflected from the second reflecting mirror 13b. The fourth reflecting mirror 13d is so situated that its convex surface shaped into the aspherical surface is directed to the light flux reflected from the third reflecting mirror 13c. Moreover, the reflecting mirrors 13a, 13b, 13c, 13d are so situated that the intervals between the first and second reflecting mirrors 13a, 13b, and between the second and third reflecting mirrors 13b, 13c are narrower than the interval between the third and fourth reflecting mirrors 13c, 13d.

In the second preferred embodiment, the reflecting mirrors 13a, 13b, 13c, 13d are formed of resin.

The light flux starting from the light source 11 is reflected by the picture-forming device 12, and successively reflected by the first to fourth reflecting mirrors 13a, 13b, 13c, 13d. Then, the light flux reflected by the fourth reflecting mirror 13d is projected on the screen (not shown). In this embodiment, the angle of view of the projected picture attains a width of more than 140°.

In this embodiment, the surfaces of the reflecting mirrors 13a, 13b, 13c, 13d shaped into the freely cured surfaces or into the aspherical surface can be represented by the aforementioned equations shown in shown in the explanation of the first preferred embodiment.

As mentioned in the above, since the four reflecting mirrors 13a, 13b, 13c, 13d are also provided for the second preferred embodiment and the intervals between the first and second reflecting mirrors 13a, 13b and between the second and third reflecting mirrors 13b, 13c are narrower than the interval between the third and fourth reflecting mirrors 13c, 13d, the angle of view of the projected picture can be widened also in the second preferred embodiment preventing the whole optical system from being magnified.

Next, in the second preferred embodiment, since the first to third reflecting mirrors 13a, 13b, 13c are shaped into the freely curved surfaces and the fourth reflecting mirror 13d is shaped into the aspherical surface, the reflecting mirrors are shaped into the far more suitably curved surfaces than those used in an optical system composed of reflecting mirrors shaped into spherically curved surfaces similarly to the first preferred embodiment. According to the second preferred embodiment, the distribution aberration can be satisfactorily corrected, and the resolution of the picture projected on the screen can be heightened.

Moreover, since the first to third reflecting mirrors 13a, 13b, 13c are shaped into the freely curved surfaces, the degree of freedom in correcting the distortion aberrations of the light fluxes reflected from the reflecting mirrors 13a, 13b, 13c can be further heightened. That is to say, since the more suitably curved surfaces of the reflecting mirrors can be provided, pending problems that the distortion aberrations cannot be effectively corrected in case that the angle of view is widened can be solved. As a result, the angle of view can be widened attaining the high resolution of the projected picture. In the second preferred embodiment, the number of the reflecting mirrors shaped in to the freely curved surfaces is not necessarily restricted to the aforementioned number, three.

In the second preferred embodiment, since the fourth reflecting mirror 13d having a larger external shape than those of the other reflecting mirrors 13a, 13b, 13c is shaped into the aspheridal surface which is easy to be processed, the processing cost of the optical system can be reduced. Furthermore, in the assembling process in which the high accuracy is required, since the optical system according to the second preferred embodiment is provided with the fourth reflecting mirror 13d shaped into the aspherical surface, the accuracy in the assembling process can be relaxed maintaining the high resolution of the projected picture. As a result, the cost originating in the assembling process can be reduced. That is to say, the cost of the whole optical system can be reduced by providing the reflecting mirror shaped into the aspherical surface (the fourth reflecting mirror 13d in the second preferred embodiment).

Moreover, since the reflecting mirrors 13a, 13b, 13c, 13d are formed of resin similarly to the first preferred embodiment, the lens-less projection optical system of the reflection type can be provided at a low price.

The lens-less projection optical system of the reflection type according to the invention is provided with the four reflecting mirrors denoted by the first to fourth reflecting mirrors. The first reflecting mirror is so situated that its reflecting surface shaped into a concavely curved surface receives the light flux starting from the picture-forming device. The second reflecting mirror is so situated that its reflecting surface shaped into a convexly curved surface is directed to the light flux reflected from the first reflecting mirror. The third reflecting mirror is so situated that its reflecting surface shaped into a convexly curved surface is directed to the light flux reflected from the second reflecting mirror. The fourth reflecting mirror is so situated that its reflecting surface shaped into a convexly curved surface is directed to a light flux reflected from the third reflecting mirror. According to the aforementioned structure, since the intervals between the adjacent reflecting mirrors can be reduced and the sizes of the respective reflecting surfaces can be reduced, the angle of view of the projected picture can be widened preventing the whole optical system from being magnified.

In the aforementioned structure, by shaping at least one of the four reflecting mirrors into a freely curved surface, the reflecting surface thereof can be shaped into an ideally curved surface. As a result, since degree of freedom in correcting the distortion aberration by a light flux reflected from the freely curved surface can be heightened, the distortion aberration can be corrected, hence the resolution of the projected picture can be heightened.

Moreover, the distortion aberration can be corrected more reasonably by adopting a following process that at least one of the reflecting surfaces of the reflecting mirrors is shaped into a freely curved surface and at least one of the remaining reflecting surfaces is shaped into an aspherical surface. In this case, since the reflecting surface can be shaped into an ideally curved surface by shaping the reflecting surface shaped into the freely curved surface, the degree of freedom in correcting the distortion aberration of the light flux reflected from the freely curved surface can be heightened. By taking the aforementioned measure, the resolution of the projected picture can be further heightened. Moreover, the cost of the optical system originating in processing the reflecting surface can be reduced by adopting the reflecting mirror shaped into an aspherical surface which is easy to be processed.

In the optical system according to the invention, since the fourth reflecting mirror having a larger external shape than those of the other reflecting mirrors can be easily processed by shaping the fourth reflecting mirror into the asperical surface, the processing cost of the optical system can be further reduced. Moreover, in the assembling process of the optical system in which the high accuracy is required, since the accuracy in assembling is relaxed because of the aforementioned structure, the cost of the whole optical system can be reduced according to this feature.

Moreover, since the respective mirrors are formed of resin, the complicated processes of grinding and polishing which are indispensable in the fabrication process of the reflecting mirrors formed of glass become unnecessary, and the fabricating cost of the optical system can be reduced.

As mentioned in the above, in the lens-less projection optical system of the reflection type according to the invention, the angle of view of the projected picture can be widened preventing the whole optical system from being magnified. Moreover, the lens-less projection optical system of the reflection type having an epochal advantage that the cost of the whole optical system is reduced can be provided.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A lens-less projection optical system of a reflection type which successively reflects a light flux starting from a picture-forming device by means of four reflecting mirrors, comprising:

a first reflecting mirror which is so situated that its reflecting surface is shaped into a concavely curved surface that receives said light flux starting from said picture-forming device, a second reflecting mirror which is so situated that its reflecting surface is shaped into a convexely curved surface that is directed to said light flux reflected from said first reflecting mirror, a third reflecting mirror which is so situated that its reflecting surface is shaped into a convexly curved surface that is directed to said light flux reflected from said second reflecting mirror, and a fourth reflecting mirror which is so situated that its reflecting surface is shaped into a convexly curved surface that is directed to said light flux reflected from said third reflecting mirror.

2. The lens-less projection optical system of a reflection type as defined in claim 1, wherein:

a reflecting surface of at least one of said four reflecting mirrors is shaped into a freely curved surface.

3. The lens-less projection optical system of a reflection type as defined in claim 1, wherein:

a reflecting surface of at least one of said four reflecting mirrors is shape into a freely curved surface, and a reflecting surface of at least one of remaining reflecting mirrors is shaped into an aspherical surface.

4. The lens-less projection optical system of a reflection type as defined in claim 3, wherein:

a reflecting surface of said fourth reflecting mirror is shaped into said aspherical surface.

5. The lens-less projection optical system of a reflection type as defined in claim 1, wherein:

each of said four reflecting mirrors formed of resin.

6. The lens-less projection optical system of a reflection type as defined in claim 1, further comprising a screen that receives said light flux from said fourth reflecting mirror so as to form a projected picture on said screen that is viewable by an operator.

7. The lens-less projection optical system of a reflection type as defined in claim 1, wherein said projected picture has an angle of view of more than 120°.

8. The lens-less projection optical system of a reflection type as defined in claim 1, wherein said projected picture has an angle of view of more than 140°.

9. The lens-less projection optical system of a reflection type as defined in claim 1, wherein said second reflecting mirror and said third reflecting mirror have coefficients of linear expansion of less than $6 \times 10^{-5}$.

10. The lens-less projection optical system of a reflection type as defined in claim 1, wherein said picture forming device reflects said light flux.

11. The lens-less projection optical system of a reflection type as defined in claim 1, wherein said picture forming device transmits said light flux.

12. The lens-less projection optical system of a reflection type as defined in claim 1, wherein said light flux is successively magnified by each of said second reflecting mirror, said third reflecting mirror, and said fourth reflecting mirror.

13. The lens-less projection optical system of a reflection type as defined in claim 1, wherein said light flux is magnified by said lens-less projection optical system.

* * * * *